United States Patent

[11] 3,599,555

| [72] | Inventor | Emery Dutch |
| | | 320 W. 77 th St., New York, N.Y. 10024 |
| [21] | Appl. No. | 16,820 |
| [22] | Filed | Mar. 5, 1970 |
| [45] | Patented | Aug. 17, 1971 |

[54] AUTOMATIC CONVEYOR FOR X-RAY FILM PROCESSING
8 Claims, 6 Drawing Figs.

| [52] | U.S. Cl. | 95/94 R, 118/423, 198/179 |
| [51] | Int. Cl. | G03d 3/12 |
| [50] | Field of Search | 95/89, 94, 100; 198/179; 118/419, 423 |

[56] References Cited
UNITED STATES PATENTS

| 1,061,667 | 5/1913 | Gerhard | 95/89 |
| 1,865,682 | 7/1932 | Dye | 95/94 |
| 2,547,979 | 4/1951 | Sabel et al. | 95/89 X |
| 3,033,351 | 5/1962 | Dutch | 95/89 X |
| 3,087,406 | 4/1963 | Dutch | 95/94 |
| 3,156,173 | 11/1964 | Meyer | 95/94 |

*Primary Examiner*—Samuel S. Matthews
*Assistant Examiner*—Fred L. Braun

ABSTRACT: An apparatus for treating sheet film such as an X-ray film in which the film is automatically transported into and between a number of processing receptacles and then through a drying chamber. The film is retained on a film engaging and carrying device in a manner ensuring its secure retention as it travels between the processing receptacles. The film is transported through each receptacle by a separate conveyor here shown as a dentated belt, and is automatically removed from one belt and conveyed onto another belt in the succeeding receptacle. As the film approaches the end of the drying chamber it is automatically stripped.

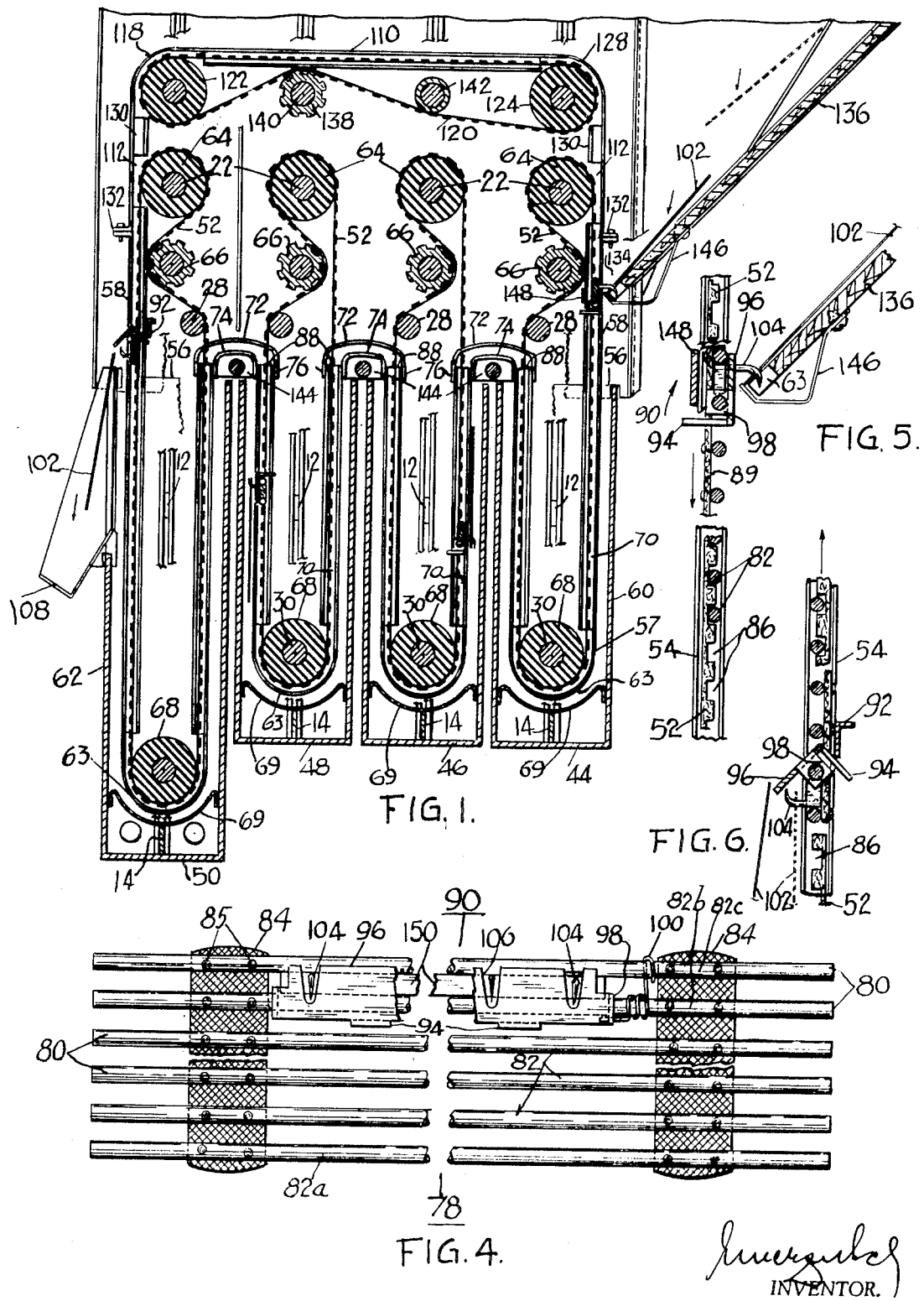

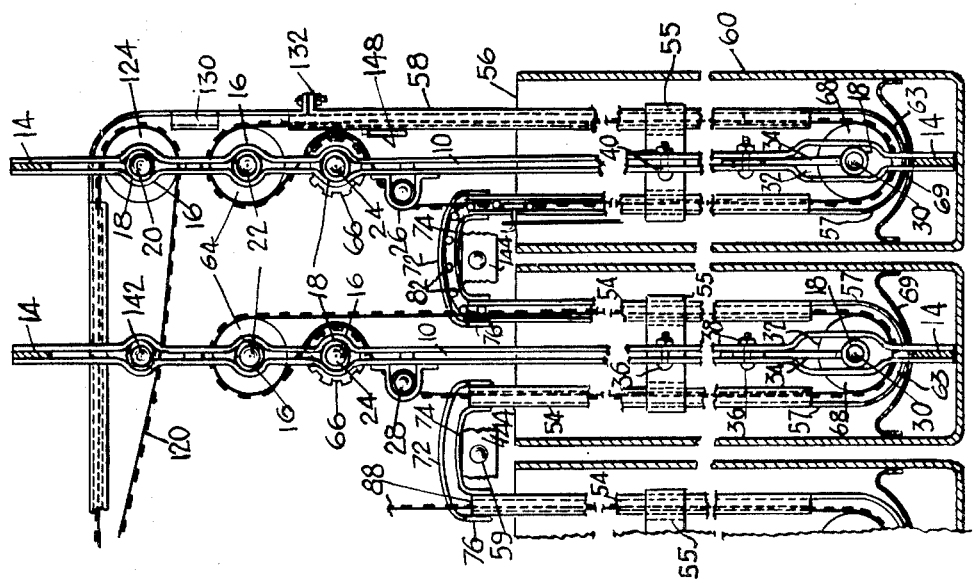

AUTOMATIC CONVEYOR FOR X-RAY FILM PROCESSING

This invention relates generally to film processing apparatus, and more particularly to apparatus of the type for treating film such as X-ray film which can be loaded in daylight and automatically released for treating in the various processing receptacles in a portable structure.

The apparatus of the invention constitutes an improvement over the film processing apparatus disclosed in U.S. Pat. No. 3,033,351 and No. 3,087,405. The apparatus disclosed in those patents is used to advantage in the movement of X-ray film during its treatment and processing. During this process the film must be securely engaged as it moves through the various sections of the apparatus. The apparatus should also be able to readily operate with film carrying cassettes of varying sizes and should operate in a substantially continuous and automatic manner. While the apparatus of those patents has proven satisfactory for its purposes, there remain areas for improvement, such as in the security of the engagement of the film as it moves through the apparatus. It is an object of the invention to afford a filmtreating apparatus that accomplishes the objects of the apparatus disclosed in said patents with a simpler mechanism having fewer film forwarding components thereby reducing the cost and required maintenance of the apparatus.

It is a further object of the invention to provide in each processing receptacle in the apparatus, separate and independent transporting means for the film engaging and carrying device, in which a more positive hold is maintained on the film.

It is another object of the invention to provide in an apparatus of the type described, dentated endless belts for use as the film engaging and carrying device, rather than frictional interlocking means as was provided in prior art film treatment apparatus so as to provide a positive locking hold on the traveling film engaging and carrying device.

It is yet a further object of the invention to provide a dual purpose ability for the film engaging and carrying structure to be capable of automatically engaging and later disengaging the sheet film after the termination of the processing period.

It is an additional object of the invention to provide in a film treating apparatus, similar conveying means for the transportation of the film engaging and carrying device to return it to the point of repeat engagement of another film after the termination of a processing point.

It is also an object of the invention to provide in a film treating apparatus, a conveniently located exit and entrance between adjacent processing receptacles for facilitating the automatic passage of the film engaging and carrying device from one processing receptacle into the following adjacent processing receptacle.

It is yet a further object of the invention to provide in a film treating apparatus, a stationary barlike member in the path of the traveling film engaging and carrying device to cause the latter to disengage itself from the processed film after which it is returned to a position for repeating the film engaging operation.

It is a general object of the invention to provide a film treating apparatus of the type described in the aforesaid patents which includes more rugged transportation means, is simpler in construction as well as in operation, and is more reliable.

With the above objects in view, the present invention includes a film treating apparatus an elongated bar having a pair of opposing side faces and a pair of longitudinal edges with a pair of rods attached to the edges of the bar and extending over the ends of the bar. A plurality of film punching pins extend from one edge of the bar, each bar having an "L" shaped portion of one leg which terminates in the tip of the pin. The other leg of the pin extends substantially perpendicular to the opposed side faces of the bar.

An elongated plate having notches formed in one of its edges is pivotally attached to one of the attached rods and extends over the face area of the bar on the side from which the pins protrude, the pins being cleared by the notches of the overlying pivotable plate. Both ends of the plate are bent perpendicularly at the ends of the bar. Each of the bent ends of the plate contain a bearing hole through which the rod closest to the unnotched edge of the plate is placed, thus permitting the notched plate to pivot around this rod. The bar also carries a coil spring maintained in tension to hold the notched plate in close, parallel relation to the pin bearing bar. The notched plate further includes two luglike portions extending back perpendicularly to the exposed side of the plate from the opposite notched edge to serve as operating levers for the pivotal movement of the notched plate.

A moving means cooperates with the film engaging structure having a leading device consisting of a pair of parallel flexible straps to which rods are evenly spaced at right angles, and the two rods of the film engaging structure are firmly attached. The latter is guided along a path so that its pins are caused to pierce through an edge of the film so that the pins serve to engage and carry the film. The combined leader and film engaging structure with the film supported from the pins of the bar, are moved through the treating apparatus, which may be a series of treating receptacles as well as through a drying chamber. As the bar approaches the end of the drying chamber, a stationary means acts in a completely automatic manner to strip the film from the pins, the film then automatically dropping onto a receiving member which positions the film where it can be conveniently removed from the apparatus in dry, fully developed condition. After the film has been stripped from the pins another moving means picks up and moves the film engaging device along another path above the treating receptacles to a location where a new film can be engaged as before.

To the accomplishment of the above and to such further objects as may hereinafter appear, the present invention relates to an automatic conveyor for X-ray film processing substantially as defined in the appended claims and as described in the following specification taken together with the accompanying drawings in which:

FIG. 1 is a longitudinal sectional elevational view of one embodiment of an apparatus according to the present invention for treating light sensitive sheet films;

FIG. 2 is an end view of the structure of FIG. 1 as seen from the left side of FIG. 1;

FIG. 3 is a fragmentary transverse sectional elevational view of part of the structure of FIG. 2 to provide the route and means of transfer between conveyors of adjacent film processing receptacles;

FIG. 4 is a fragmentary elevational view of the sheet film's engaging and carrying structure and its leading device;

FIG. 5 is a fragmentary sectional elevational view of part of structure of FIG. 4; and FIG. 6 is another fragmentary sectional elevational view of part of the sheet film engaging and carrying structure for providing a stationary automatic disengaging means.

Referring initially to FIGS. 2 and 3, the structure of the invention includes a frame composed in part of two pairs of parallel, identical, upright flat bars 10. Each pair of bars have their flat sides facing each other and are spaced by in-between welded filler plates 12 and by perpendicularly set top and bottom tie bars 14 preferably welded to the top and bottom end portions of the paired upright bars 10. The bars 10 and tie bars 14 form a quadrangular frame which support the other parts of the apparatus of the invention. For this purpose several correspondingly opposing semicircular bends 16 are provided in the upright pairs supporting bars 10 to provide seats for tubular bearing 18 in which shafts 20, 22, and 24 are rotatably supported. Separate bent straps 26 are provided to house tubular bearings 18 for a shaft 28 welded offset to the inner side of the upright paired supporting bars 10 for purposes to be described below. An elongated slotlike bearing housing is provided for shaft 30 in the space between corresponding opposedly bent out portions 32 near the lower end of the paired upright supporting bars 10 to permit slidable positioning of the bearings along the bearing housing. An adjustable bearing retaining sliding strip 34 is set between bars 10 and extends down to the outer circular bearing surface of shaft 30, thereby to securely located shaft 30 in the most favorable setting by means of a tightening bolt 36 and a nut 38, bolt 36 entering through bolt holes 40 formed in paired supporting bars 10, and through slotted hole 42 in sliding strip 34.

The conveying mechanisms arranged in each of the film processing receptacles 44, 46, 48 and 50 (FIG. 1) each comprise a pair of dentated endless traveling belts 52 moving along in guide tracks arranged in the spaces defined by the elongated flanges and the narrow web of a pair of guide channels 54 set apart close to the paired supporting bars 10. The adjacent guide channels are maintained in their desired spaced relation by means of clamps 55. The flanges of both channels 54 are parallel to each other in their corresponding planes and their open throats face one another. Channels 54 extend downward into the processing receptacles 46—50 and are shaped in the form of an upright "U" with both of its legs 57 slightly protruding above the rim 56 of the receptacles, except for legs 58 which define an extended guide channel and extend next to the outer walls 60 and 62 of receptacles 44 and 50 respectively. The lower section of channel 54 is in the form of an arcuate plate 63 extending between the lower ends of legs 57. The traveling endless conveyor belts 52, which are commonly called timing belts, follow identical unconfined routes above each processing receptacle, those courses being determined by the circuit around an upper belt pulley 64 mounted on shaft 22, followed by a partial circling circumferentially dentated driver pulley 66 mounted on outwardly extending driving shaft 24 and finally by idler shaft 28, which as described above is mounted offset in relation to shafts 22 and 24. Within the processing receptacles 44—50, the route of the belts guide 52 is determined by guide channels 54 and a lower belt pulley 68 mounted on shaft 30. An arcuate deflecting plate 69 extends across the lower portions of receptacles 44—50 to deflect the moving film from the bottom of the wall of the receptacle.

The traveling motion of the conveyor belts 52 along the above-described route is initiated by the circumferentially dentated driver pulley 66 rotating in a counterclockwise sense, engaging several teeth of belt 52 in succession, thereby causing a generally upward motion of the conveyor belt around the periphery of the upper belt pulley 64. Leaving upper belt pulley 64, the conveyor belt 52 moves downwardly thereafter and enters a confining tracking hollow space 70 of guide channel 54 continuing further down and around lower belt pulley 68 located centrally of the semicircular bend of the U-shaped guiding channel. As the belt emerges at the upper end of this leg, it passes over delineating idler shaft 28, continuing on to the driver pulley 66; thereby completing the conveying cycle in the manner described above within and above of each processing receptacle separately and independently from each other.

Automatic transit means between the receptacles is provided by a pair of parallel bent straps formed as a doubled arched bridging means 72 and 74 anchored to the protruding top ends of the guide channels 54. The arching continuance of the flanges of the guide channels between the upper and lower bent straps 72 and 74 defines an arcuate transit route to the straight upright routes of the guide channels in the receptacles. The lower bent strap arches over the upper ends of adjacent processing receptacles (FIGS. 1 and 3) and its ends are attached to the inner flanges of the two guide channels facing each other across the tops of the adjacent walls of the neighboring receptacles. The ends of the upper arching strap 72 are fastened to the outer flanges of these two guide channels by means of tonguelike members 76 extending from the lower ends of strap 72. The tonguelike members of the upper arch strap position the body of that strap beyond the straight line continuance of the outer flange of the two guide channels. As a result, the upper arching strap 72 vertically occupies an offset position relative to lower arching strap 74, thus clearing completely the traveling conveyor belts 52 when entering or emerging from the guide channels of the processing receptacles as shown in FIG. 2. However, when viewed in the horizontal aspect, the two arching straps 72 and 74 offer an unbroken arching passage between the conveying means of adjacent processing receptacles as illustrated in FIG. 3.

FIG. 4 illustrates the film engaging and carrying device 78 adapted for being transported by dentated conveyor belts 52 during the processing operation within the receptacles, and in transit between the processing receptacles. End portions 80 of rods 82, 82a and 82b extend beyond the flexible straps 84 to which they are attached by means such as rivets 85 and are accommodated in the interteeth spaces 86 of conveyor belt 52 (FIGS. 5 and 6) while traveling within guide channels 54. When leading first rod 82a of film engaging and carrying device 78 arrives at and then passes beyond the protruding upper portions 88 of the guide channels 54, the end portions of that rod are intercepted by upper arched strap 72, and are automatically separated from the conveyor belts 52. The rod end portions 80 are then guided by upper arched strap 72 and move along, followed in sequence by the other rods 82 and 82b. The end portions 80 of the latter are moved upwardly by the traveling conveyor belts, and after separation are forced to move ahead in the curved tracking space defined between upper and lower arched straps 72 and 74. At the following end of the curved tracking space, the end of leading rod 82a engages the downward traveling conveyor belts of the succeeding adjacent receptacle followed by the remaining rods of the film engaging and carrying device. Consequently, when the last two rods 82b carrying the film punching and holding structure 90 arrive to the intercepting upper arch belt 72, the leading rods 82a and 80 have already met and are traveling together in the guide channels of the adjacent processing receptacle while the upwardly moving conveyor belts of the preceding receptacle, now freed from the film engaging and carrying device, follow their unconfined route above the receptacles over the delineating roller 28 to and partly around the belt forwarding dentated gear 66, and from there around upper belt pulley 64 and down into the other leg of the guide channel 54. This cycle of movement of the traveling conveyor belts and the transportation of the film engaging and carrying device is automatically repeated whenever the film engaging and carrying device leaves one and enters the following processing receptacle through the interreceptacle transit guide defined by belts 72 and 74.

A conveniently located transversal angle bar 92 (FIG. 1), fastened to the inner faces of the upwardly extended guide channels 54 above the outermost processing or drying receptacle 50, acts as an automatic tripping means for the release of a processed film carried through the processing receptacles by the film engaging and carrying device 78. The leading rods 82a and 80 of device 78, transported by the conveyor belts 52 on their upward course within the extended guide channels 58, pass by tripping angle bar 92 until the inwardly bent luglike members 94 of a pivotally operating notched plate 96 strike tripping bar 92, causing lugs 94 to be tilted downwardly as shown on FIG. 6, thereby forcing the firmly connected notched plate 96 to move from its rest position as shown on FIG. 4, in which it is maintained by the action of a coil spring 100. The processed film 102 is thereby removed from the film hooking pins 104 by means of the unnotched solid sections of plate 96 between notches 106, allowing the separated film 102 to fall by gravity into a conveniently located hopper 108 (FIG. 1) from where the operator may remove it at his convenience.

Film engaging and carrying device 78, now relieved from carrying film 102, continues its upward course along extended guide channel 58 and of its continuation 110 (FIG. 1), and is forwarded by conveyor belt 52 until it reaches belt pulley 64 where the conveyor belt 52 leaves its guided route in the channel 110 through a notched section 112, leaving the leading rods of the film engaging and carrying device in the guide channel, and proceeds to run to and around upper belt pulley 64, thereby continuing its course on the cycle described hereinbefore. In the meanwhile, the leading rods of device 78, now disengaged from conveyor belt 52, continue their travel through a partial portion 114 in guide channel 110, while the remaining rods 82 and 82b are still being forwarded. Thus the entire film engaging device 78 is forwarded by conveyor belt 52 until the latter separates itself from the last remaining rods 82 and 82b of the film engaging and carrying device 78 at the notched section 112 as described above.

Referring to FIGS. 1 and 2, there is shown an overhead mechanism for returning the film engaging and carrying device 78 from the last processing receptacle 50 to the first receptacle 44 for its operation, the method and elements of transportation used being similar to the ones described above as employed in the processing receptacles. The leading rods of the film engaging and carrying device pass by a partial guide channel portion and enter into a quadrant section 118 of guide channel 110 where a traveling conveyor belt 120 engages end portions 80 of these rods, thereby carrying the complete film engaging and carrying device into and through generally horizontal guide channel 110. Conveyor belt 120 passes over a belt pulley 122 disposed at one end of guide channel 110, and a belt pulley 124 disposed at the other end of the channel, the latter terminating in a quadrant section 128. Both quadrant sections 118 and 128 respectively have their inner flanges adjacent to belt pulleys 122 and 124 notched out to permit conveyor belt 120 to run over the periphery of these pulleys which are concentrically located within the notched quadrant sections. After the traveling belt conveyor 120 passes by the outermost tangent line of pulley 124, the momentarily unguided leading bar end portions of the film engaging and carrying device become disengaged from the conveyor belt 120, and thereafter automatically following the tangential course about pulley 124, enter a partial guide channel 130, and through it passes onto the dentated conveyor belt 52 moving downwardly from belt pulley 64. The film engaging and carrying device is then reengaged in the notched section 112 of the guide channel 110. Thereafter, conveyor belt 52 and the film engaging and carrying device travel together by means of the engaged end-portion of its bars passing by a bolted joint 132 into extended guide channel 58 toward a location 134 where a film piercing engaging pins 104 of film engaging structure 90 can pick up and carry away a new sheet of film from a cassette supporting plate 136 for processing in the various receptacles. The movement of the film engaging and carrying device 78 from the last processing receptacle to the first receptacles is accomplished by gear pulley 138 mounted on an outwardly extended driver shaft 140 located on the dentated side of the endless conveyor belt 120 along the lower run of the belt between the two end belt pulleys 122 and 124. An idler roller 142 serves to enhance the grip of gear pulley 138 on the conveyor belt 120. Inter receptacle idler rollers (not shown) rotating in bearings provided in plates 144 (FIGS. 1 and 2) over which the sheet film travels in passing from one processing receptacle to the next receptacle, are provided to prevent scraping of the film by the rims of the adjacent processing receptacles.

Referring to FIG. 5, film engaging and carrying device 78 is shown on a larger scale, as pins 104 of the film engaging structure 90 punch through near the lower edge of the sheet film where it is held in place on the cassette supporting plate 136 by means of stop pins 146 extending upward in front of the lower edge of plate 136. Plate 136 is provided with notches cut out along its lower edge in correspondence with the positions of punching pins 104 to permit these pins to penetrate through the body of the film. Notched plate 96 of the film engaging structure 90 is indicated in its nonactivated normal position, and a backup plate 148 oppositely to the lower end of cassette supporting plate 136 is disposed on the outer face of inner flange of guide channel 58 to prevent pin supporting bar 150 and attached rods 82b and 82c from tilting back at the instant the pins pierce the film, thereby to assure a definite punching through the film for its engagement with structure 90.

The parts, when in the position shown in FIG. 6, indicate the action of stripping the film from the engaging pins 104 by the notched plate 96 which has been moved away from its normal position by the levering action of its luglike extensions 94 when they were encountered by tripping angle bar 92 on the upward travel of the film engaging and carrying device, leaving the last processing receptacle.

FIG. 1 also illustrates the cassette supporting assembly to which no reference is herein made as it is completely described in U.S. Pat. No. 3,087,406. The cassette supporting assembly is embodied in the present instance by way of illustration in a machine comprising a series of receptacles for photographic processing solutions, each containing a new mechanism for conveying sheet film material therethrough, a new film engaging device, and a new stationary film releasing stripper means provided for automatic releasing of the film from the hooking pins of the film engaging and carrying device of which any convenient number may be used throughout the processing apparatus.

While the invention has been illustrated and described as embodied in a conveying apparatus for handling sheet (X-ray) films, it is not intended to be limited to the details shown since modifications and structural changes may be made without departing any way from the spirit of the present invention.

I claim:

1. A mechanism for processing photographic sheet films such as X-ray films or the like, said mechanism comprising a plurality of processing receptacles, separate succeedingly moveable film engaging and carrying means including a support, and a plurality of spaced rods carried on said support for engaging the forward edge of the film, one of said film engaging and carrying means being transitionally positioned in the path of the forward edge of the film and thereafter being effective to move the film to one of said processing receptacles, said film engaging and carrying means comprising means carried by at least one of said rods for piercingly engaging the sheet film at the time of the last mentioned movement, separate conveying means in each of said receptacles for carrying said film engaging and carrying means therethrough, said separate conveying means including a dentated flexible belt having a plurality of spaced projections for receiving said rods in the spaces defined therebetween, and stationary means arranged intermediate said receptacles for removing said film engaging means from one of said conveying means and guiding said film engaging and carrying means from said one of said conveying means to another of said conveying means in a succeeding one of said receptacles.

2. The mechanism of claim 1, further comprising means for automatically stripping the film from said film engaging and carrying means after the latter leaves one of said processing receptacles and moves to a position for reengaging a new film.

3. The mechanism of claim 1, in which said stationary means includes a pair of spaced arcuate flexible straps each extending across the upper ends of adjacent ones of said receptacles and defining an arcuate channel for said film engaging and carrying means between said adjacent receptacles.

4. In a mechanism for processing photographic sheet films, the combination with gravity feeding means and a plurality of processing receptacles which comprises separate and succeedingly movable film engaging and carrying means engageable with the forward edge of a sheet film, one of said film engaging and carrying means being transitionally positioned in the path of the forward edge of the sheet film, a plurality of conveying means including dentated flexible belt means respectively riding in the hollow of rigid channels defined in said receptacles for carrying in the interteeth spacing thereon said film engaging and carrying means therethrough, and stationary means positioned above and bridging adjacent ones of said receptacles and defining guide channels between said adjacent receptacles, for guiding said film engaging and carrying means through said guide channels between adjacent ones of said receptacles and from one of said conveying means to another of said conveying means.

5. In a mechanism for processing photographic sheet films, the combination with gravity feeding means and a plurality of processing receptacles which comprises separate and succeedingly movable film engaging and carrying means engageable with the forward edge of a sheet film, one of said film engaging and carrying means being transitionally positioned in the path of the forward edge of the sheet film, said film engaging and carrying means including a pair of spaced parallel flexible straps disposed over a plurality of substantially equally spaced rods secured to said flexible supporting straps, the end portions of said rods extending beyond said supporting straps, flat bar extending between said supporting straps and fixed on its edge sides to and between a pair of said rods adjacent the ends of said flexible straps, a line of perpendicularly protruding punching pins on one face of said bar, a plate having notches formed on one edge at positions corresponding to the arrangement of said protruding punching pins and pivotally attached to said pair of said rods, said flat bar and said notched plate being disposed between said supporting flexible straps, and means located in the path of travel of said film engaging and carrying means for engaging said notched plate to effect angular movement of said notched plate about its pivotal rod, resulting in a sweeping action of the notched edge of said plate over the bent pins, thereby stripping the sheet film from the pins.

6. In a mechanism for processing photographic sheet films, the combination with gravity feeding stationary means and a plurality of processing receptacles of separate conveying means in each of said receptacles, a framed support for said conveying means removably arranged in said receptacle, a driver shaft mounted in said frame support having a circumferentially dentated driver pulley thereon, a dentated belt mounted on said driver pulley, a pair of rolling shafts mounted in said frame support, a pair of pulleys mounted on said rolling shafts, one of said rolling shafts being located above said driver shaft, and another of said shafts being mounted beneath the driver shaft within the processing receptacle, said dentated conveyor belt running around said pulleys of the upper and lower rolling shafts, the lower part of the run of said conveying means within the processing receptacle being guided in the narrow space between the flanges of a short webbed channel formed in the shape of a "U" with the semicircular bottom portion of the "U" being concentrically set with the lower pulley, the bottom half of said lower pulley being encompassed by the exterior flange of the semicircularly bent portion of the guide channel, both legs of the U-shaped guide channel extending upwardly and terminating slightly above the rims of the processing receptacles excepting the outer legs of the guide channels in the first and last processing receptacles, said guide channels acting as component members of said conveying means in the processing receptacles for carrying the film engaging and carrying device therethrough, and stationary means for guiding said film engaging and carrying means from one of said receptacles to another.

7. In a mechanism for processing sheet films, the combination with gravity feeding means and a plurality of processing receptacles of separate and succeedingly movable film engaging and carrying means, including a pair of supporting parallel flexible straps disposed over a plurality of parallel perpendicularly arranged substantially equally spaced rods fixed to said flexible supporting straps, the end portions of said rods extending beyond the edges of said supporting straps, a frame support, a driven shaft mounted on said support and having a dentated conveyor belt carried thereon, the end portions of said rods penetrating into the interior of a pair of guide channels disposed close to said frame support, said end portions of said rods and said dentated conveyor belts traveling together within the interior of the guide channels and acting in unison as the conveying means for said film engaging and carrying means and traveling together through each of said processing receptacles, and stationary means located above the rims of adjacent ones of said processing receptacles for separating said film engaging and carrying means from said conveying means of one of said processing receptacles and for guiding said film engaging and carrying means to said conveying means of another of said processing receptacles.

8. In a mechanism for processing photographic sheet films, the combination with gravity feeding stationary means and a plurality of processing receptacles of separate and succeedingly movable film engaging and carrying means engageable with the forward edge of the sheet film, one of said film engaging and carrying means being transitionally positioned in the path of the forward edge of the sheet film and means for thereafter moving the film engaging and carrying means together with the engaged sheet film through said processing receptacles inclusive of a last receptacle of said receptacles, including an upwardly extended outermost leg of a guide channel, and means attached to said extended leg for stripping the film from said film engaging and carrying means and for returning said film engaging and carrying means to a location for engagement with a new sheet film, said returning means including separate conveyor belts and guide channels directly leading from the guide channel of the last of said processing receptacles to the guide channels of the first of said processing receptacles disposed above the conveying means of all of said processing receptacles, a dentated driver pulley mounted on an outwardly extended driver shaft and a pair of driven plain belt pulleys mounted on rotatable driven shafts, one of said shafts being mounted in the upper part of the framed support of the first of said processing receptacles, another pulley shaft being mounted generally at the same level in the top part of the framed support of the last of said processing receptacles, said outwardly extended driver shaft being mounted in the framed support of an intermediate of one of said processing receptacles.